P. DOWDICAN.
Cover for Sink-Outlets.
No. 222,258.  Patented Dec. 2, 1879.
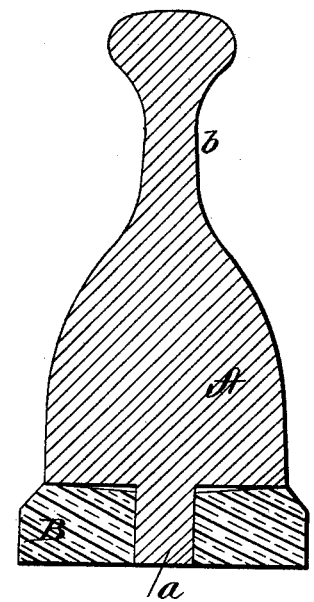
WITNESSES
P. L. Ousaud
E. H. Bradford
INVENTOR
Peter Dowdican
By H. J. Ennis
ATTORNEY

UNITED STATES PATENT OFFICE.

PETER DOWDICAN, OF CHICAGO, ILLINOIS.

IMPROVEMENT IN COVERS FOR SINK-OUTLETS.

Specification forming part of Letters Patent No. 222,258, dated December 2, 1879; application filed October 18, 1879.

*To all whom it may concern:*

Be it known that I, PETER DOWDICAN, of Chicago, in the county of Cook and State of Illinois, have invented certain new and useful Improvements in Covers for Sink-Outlets; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to an improved cover for sink-outlets in that class of sinks in which the eduction or waste-water escape at the bottom of the sink is through a series of perforations leading to a chamber below communicating with a waste pipe.

My invention consists of a cover having an elastic base of sufficient area to cover the perforated portions of the sink leading to the waste-pipe, and provided with an upwardly-extending handle by means of which it can be conveniently placed in position over the perforations in the bottom of a sink, the construction being more fully hereinafter specified.

The drawing represents a vertical sectional view of my improved valve, in which the letter A indicates the body of the valve, which is constructed of metal or other suitable material, and is formed with a projection, *a*, below, upon which is fitted an elastic base, B, which is, preferably, of vulcanized rubber, although it may be composed of any other suitable material. The body A of the valve is tapered upwardly, forming a handle, *b*, by which it may be placed over or removed from the perforated outlet in the sink.

I am aware that a cover for sink-holes attached to the sink, and having a handle and an elastic packing-ring for resting upon the sink around the opening leading to the waste-pipe, is old; also, that a similar cover, which is not secured to the sink, is used, having a handle and elastic packing-ring, and such I distinctly disclaim as my invention. Such construction is, however, obviously objectionable for the reason that said packing-ring will soon unevenly wear away, thus rendering the cover useless, while in my cover the elastic base comes in contact with the surface of the perforated plate, which ordinarily covers the sink-outlet, thus insuring a more or less perfect seal, even after the edge of the disk is worn.

I claim as my invention—

The herein-described cover for sink-outlets, consisting of the handle A *b*, having projection *a*, and provided with the solid rubber disk B, adapted to directly cover the perforated portion of a sink leading to the waste-pipe, as specified.

In testimony that I claim the foregoing I have hereunto set my hand this 29th day of September, 1879.

PETER DOWDICAN.

Witnesses:
JULIUS KATZ,
H. A. KAUFMAN.